May 15, 1923.

M. HIGUCHI

AMUSEMENT APPARATUS

Filed July 12, 1921

Monnosuke Higuchi.
INVENTOR

BY Victor J. Evans
ATTORNEY

WITNESS:

May 15, 1923.  
M. HIGUCHI  
1,454,968  
AMUSEMENT APPARATUS  
Filed July 12, 1921 6 Sheets-Sheet 2
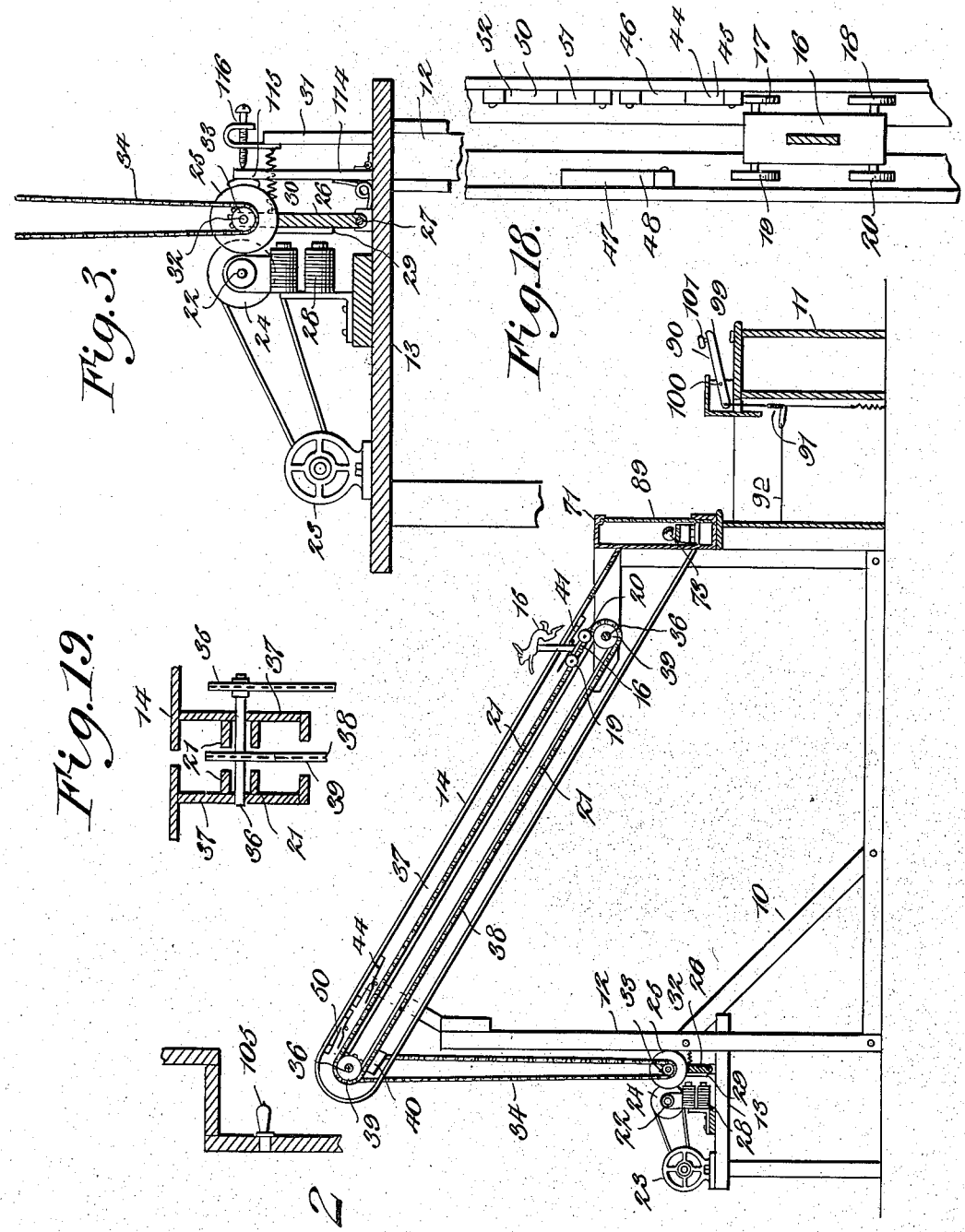

May 15, 1923.
M. HIGUCHI
AMUSEMENT APPARATUS
Filed July 12, 1921
1,454,968
6 Sheets-Sheet 3
Fig. 4.
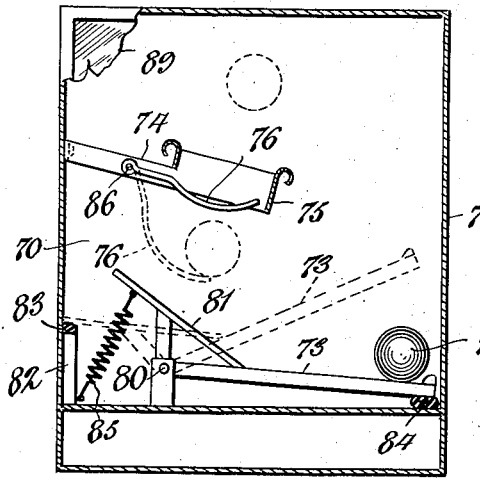
Fig. 5.
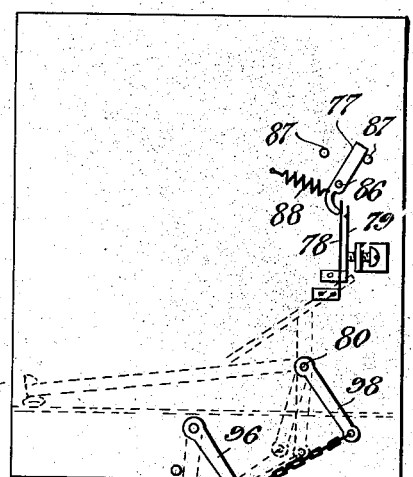
Fig. 9.
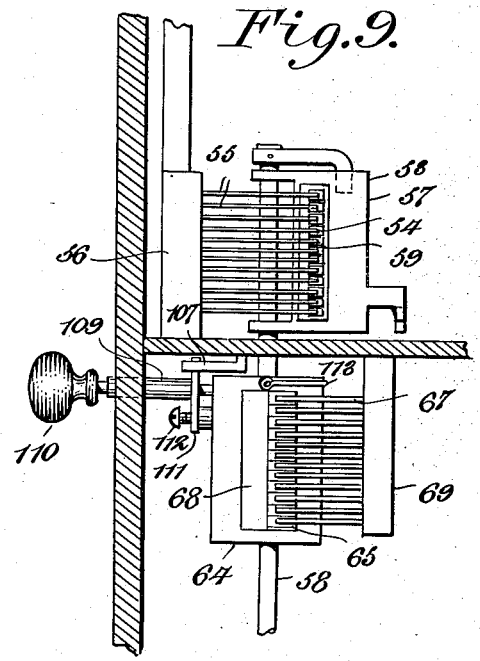
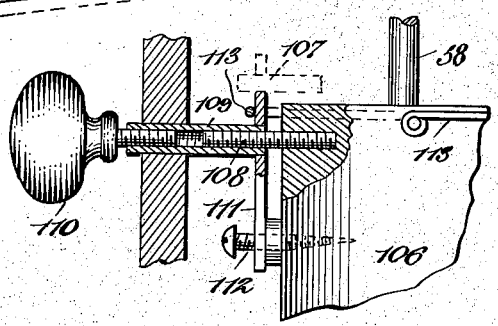
Fig. 8.
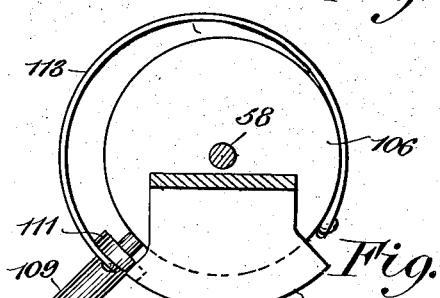
Fig. 7.
Monnosuke Higuchi. INVENTOR
BY Victor J. Evans
ATTORNEY
WITNESS:

May 15, 1923.

M. HIGUCHI

AMUSEMENT APPARATUS

Filed July 12, 1921　　6 Sheets-Sheet 4

1,454,968

Monnosuke Higuchi, INVENTOR

BY Victor J. Evans ATTORNEY

WITNESS:

May 15, 1923.

M. HIGUCHI

AMUSEMENT APPARATUS

Filed July 12, 1921  6 Sheets-Sheet 5

Monnosuke Higuchi, INVENTOR

BY Victor J. Evans ATTORNEY

WITNESS: J.W. Ely

May 15, 1923.

M. HIGUCHI

AMUSEMENT APPARATUS

Filed July 12, 1921   6 Sheets-Sheet 6

1,454,968

Monnosuke Higuchi, INVENTOR

BY Victor J. Evans, ATTORNEY

WITNESS:

Patented May 15, 1923.

1,454,968

UNITED STATES PATENT OFFICE.

MONNOSUKE HIGUCHI, OF COLLEGE POINT, NEW YORK.

AMUSEMENT APPARATUS.

Application filed July 12, 1921. Serial No. 484,117.

*To all whom it may concern:*

Be it known that I, MONNOSUKE HIGUCHI, a citizen of Japan, residing at College Point, in the county of Queens and State of New York, have invented new and useful Improvements in Amusement Apparatus, of which the following is a specification.

This invention relates to amusement apparatuses.

Some of the objects of the present invention are: to produce a device or apparatus in which a plurality of objects are movable over a supporting structure part of which structure is in simulation of a hillside, and in which the objects are movable singly and simultaneously, and in which the moving of any one of said objects to a predetermined point renders all of the other objects movable up to certain predetermined points only; to employ normally open circuit closers which are operable by the manipulation and in virtue of encased but freely movable balls; to employ an automatically operable circuit breaker connected in common with different sets of circuits and operable upon the closing of one circuit of one set and the simultaneously opening of one circuit of another set, to cause the closing of a single circuit of still another set of circuits; to employ the said ball actuated circuit closers in a manner so as to be operable from remote points and to place them in positions of exhibition so that competitors endeavoring to actuate the circuit closers may guide themselves in the exercise of skill, the element most necessary to actuate the circuits; to produce a device as characterized in which the objects are movable singly and simultaneously, and in which the moving of any one particular object of the objects to a predetermined point renders all of the other objects movable singly or simultaneously up to certain predetermined points only, and during the movement of the particular object to the goal which is signified by the lighting of a lamp, the other objects remain immovable; to provide means for effecting the movement of all of the objects simultaneously to a starting point after one of the objects has reached the goal. With these and other objects in view the invention resides in the provision, combination, relative disposition, and operation of parts hereinafter more fully described and illustrated in the accompanying drawings, in which:

Figure 2 is a longitudinal sectional view on the line 2—2, Figure 1.

Figure 3 is an enlarged view of the electromagnetic driving mechanism.

Figure 4 is an enlarged view of one of the ball actuated circuit closers.

Figure 5 is an enlarged view of the contacts forming a part of the ball actuated circuit closer shown in Figure 5, and showing also operating connections.

Figure 7 is a detail view of the means for operating the manually operable circuit breaker.

Figure 8 is a plan view of the means shown in Figure 7.

Figure 1:
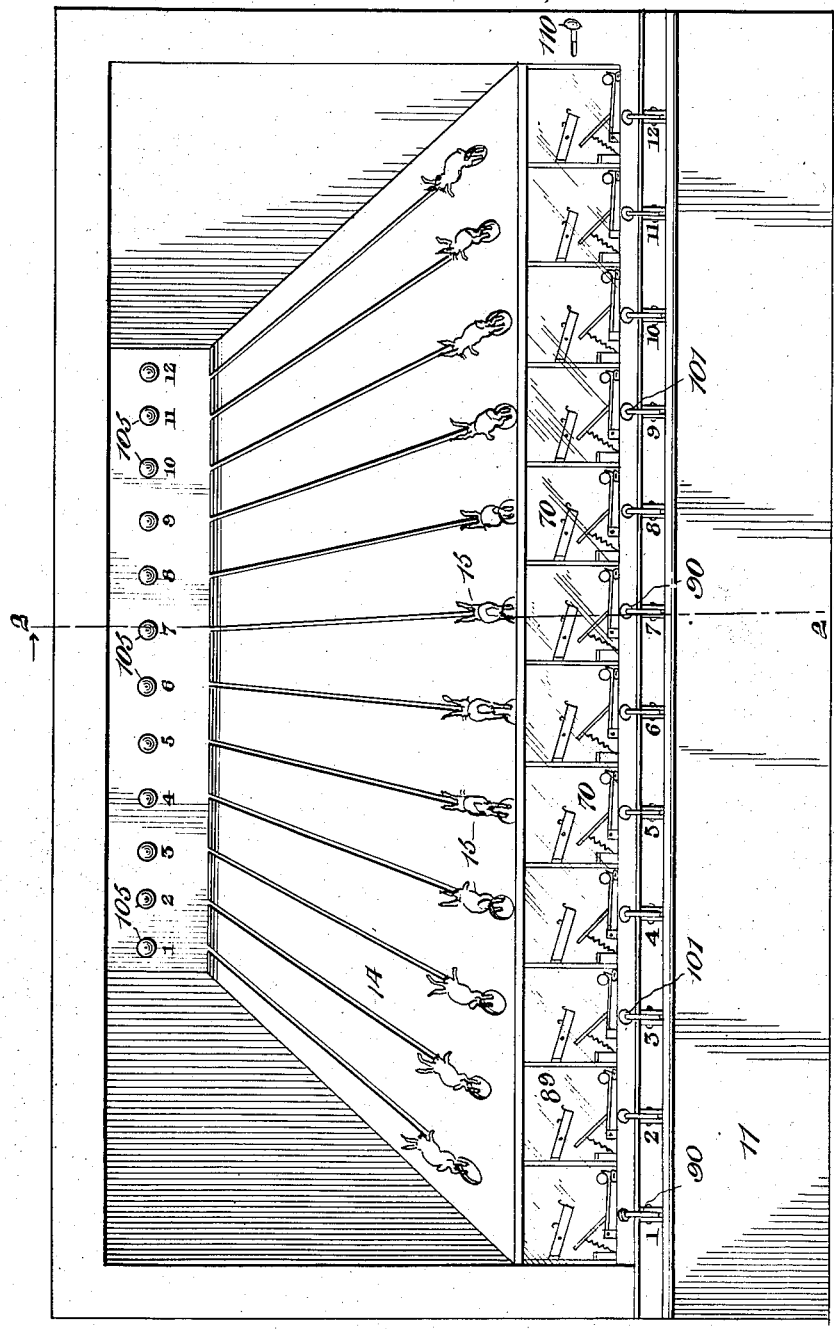
Figure 1 is a front elevation of the device of the present invention.
Figure 10:
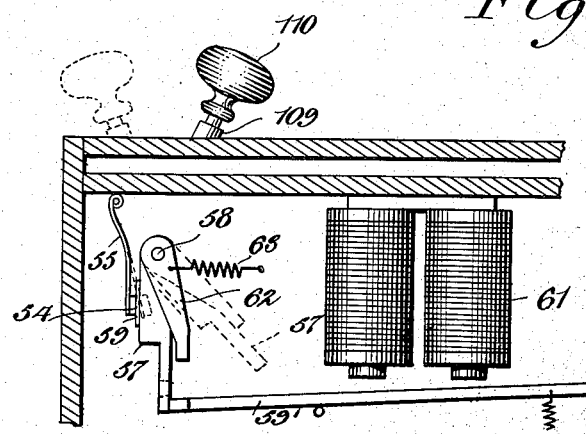
Figure 11:
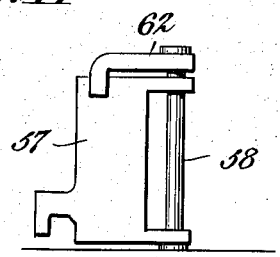
Figure 6:
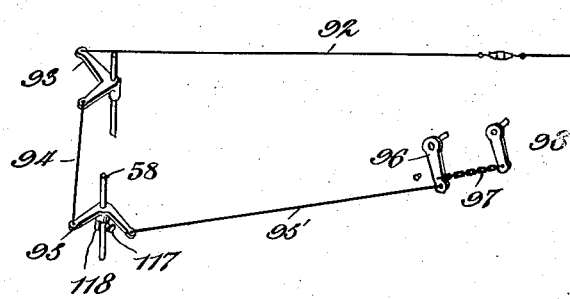
Figure 6 is a detail view of one of the manipulating elements.
Figure 12:
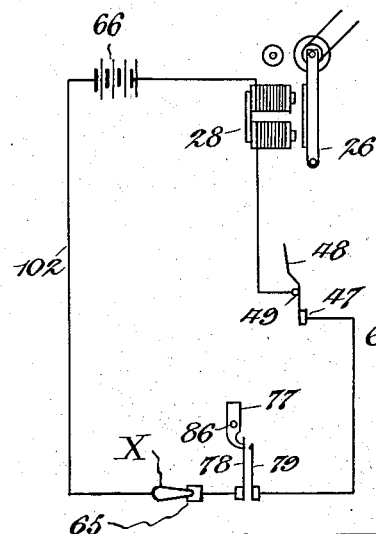
Figure 14:
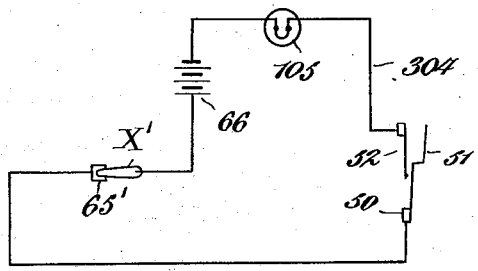

Figures 9, 10, and 11 are detail views of the automatic circuit breaker.

Figures 12, 13, 14 and 15 are diagrammatic views showing individual or branch circuits; showing the parts affected in each circuit.

Figure 16:
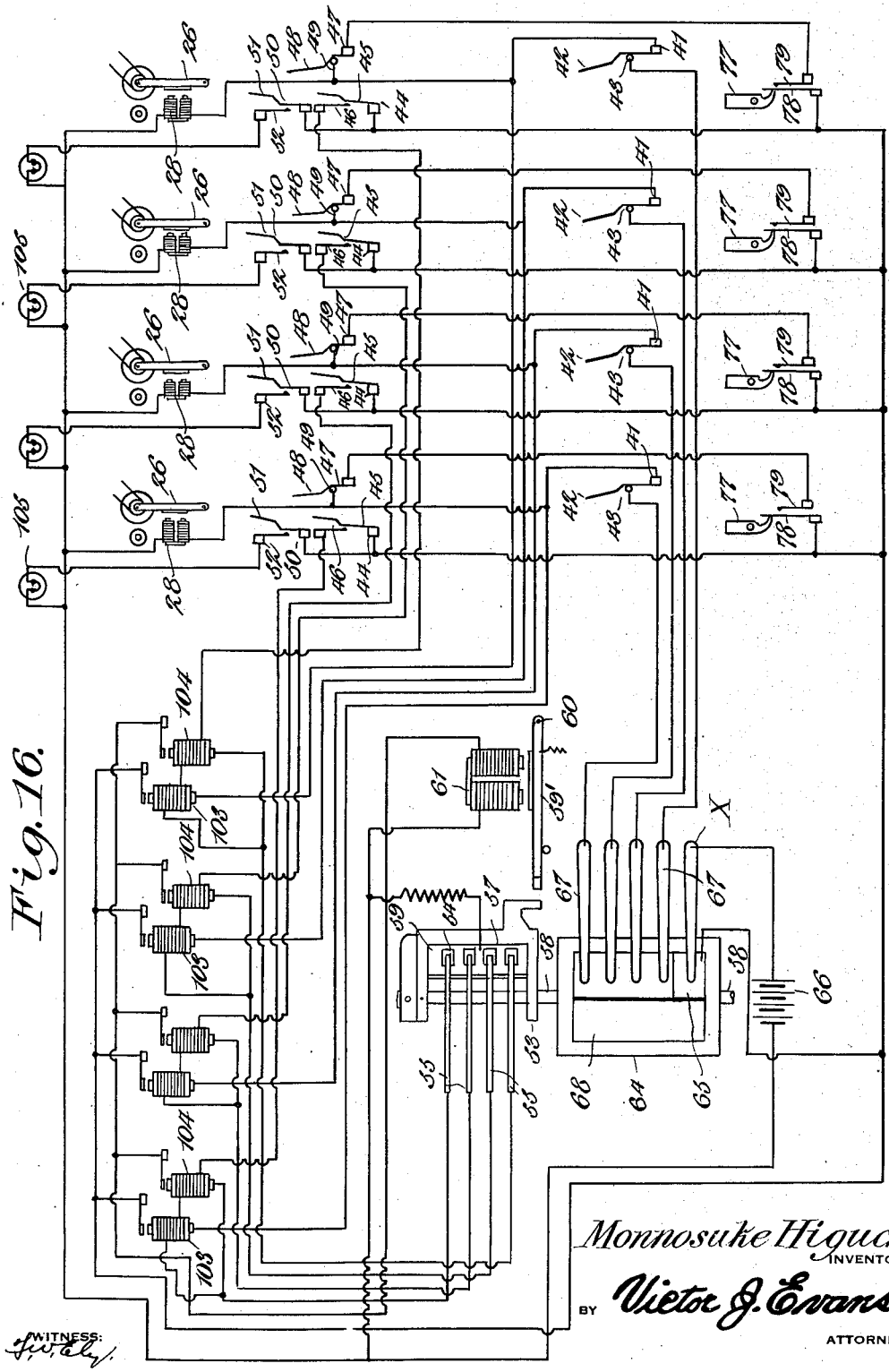

Figure 16 is a diagrammatic view of the wiring for the complete device.

Figure 17:
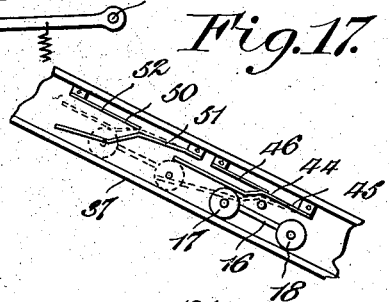

Figures 17, 18 and 19 are detail views of several features of the invention.

Referring now more particularly to the views of the drawings for all of the details, it will be manifest that, the device of the present invention will include a supporting structure 10 and a supporting structure 11. The structure 10 includes a frame 12. A shelf 13 is carried by the frame 12 and supports parts of the driving mechanism. A race plate 14 is supported by the frame 12 and the top face thereof is painted in simulation of a hillside or mountainside. A plurality of objects—inanimate objects in the nature of rabbits or any other similar or dissimilar living things are employed as a part of the device and it is within the present invention that these objects be made to race up the hillside. In the present instance twelve objects or rabbits are employed and there are twelve manipulators which are operatively related respectively to the said rabbits, and which are for manipulation by competitors. Each competitor will endeavor to get his rabbit to the goal first to be declared the winner. While twelve rabbits have been shown it is to be understood that any number may be employed as may be desired. Each rabbit 15 is mounted on a carriage 16 having four wheels 17, 18, 19 and 20. The support for the rabbit which rises from the carriage extends through a slot in the plate 14. Each rabbit and its carriage is supported for movement by tracks 21, 21.

There is provided mechansim for effecting the movement of the rabbits individually. The said mechanism includes a driven shaft 22 supported in suitable bearings attached to the shelf 13. The shaft is driven continuously by a motor, preferably an electric motor 23 through the intervention of pulleys and a belt, or sprocket wheels and a chain may be employed. Secured fast to the shaft 22 there are twelve small wooden wheels 24. Coactively arranged with respect to the wheels or pulleys 24 there are wheels or pulleys 25, preferably of wood. Each wheel 25 is carried by a member 26 which is pivotally mounted as at 27. Arranged adjacent each member 26 is an electro-magnet 28 which when energized attracts an armature 29 carried by its relatively arranged member 26 to bring the coactively arranged wheels 24 and 25 into engagement with each other for a purpose to appear. Each member 26 and its wheel 25 is held in a retracted position by a spring 30 which has one end attached to the member 26 and the opposite end thereof is attached to a post 31. Each wheel 25 is supported for rotation on a shaft 32 and each shaft 32 has attached thereto a small sprocket wheel 33. A chain 34 passes around each wheel 33,—there being twelve chains therefor,—and around a sprocket wheel 35.

Inasmuch as each of the rabbits is moved in a similar manner and with similar means which are connected to the driving mechanism of the last preceding paragraph, it will be sufficient for the sake of convenience to describe the means operatively related to but one rabbit. Shafts 36, 36 are supported by members 37, 37 arranged in spaced relation and which are supported by the frame 12. The said members 37, 37 also support the tracks 21, 21. A chain 38 passes around sprocket wheels 39, 39, attached to the shafts 36, 36. One of the shafts 36 has attached thereto one of the said sprocket wheels 35. The carriage 16 is connected to the chain 38 so as to move therewith. A weight 40 is attached to the chain 38 to act as a balance to facilitate the movement of the rabbit. A circuit closer 41 comprising contacts 42 and 43 is arranged at the lower end of one of the members 37 in the path of movement of the wheels 19 and 20 of the carriage 16. A circuit breaker 44 comprising contacts 45 and 46 is arranged near the upper end of the other member 37 in the path of movement of the wheels 17 and 18 of the carriage 16. A circuit closer 47 comprising contacts 48 and 49 is arranged in the path of movement of the wheels 19 and 20 and said circuit closer is arranged slightly in advance of the circuit breaker 44, relatively speaking. A circuit closer 50 comprising contacts 51 and 52 is arranged in the path of movement of the wheels 17 and 18 of the carriage 16, and said circuit closer 50 is arranged in advance of the circuit breaker 47.

As stated it is within the present invention to make provision for the movement of objects—the rabbits 15—individually or singly until one of the rabbits reaches a certain predetermined point after which the other rabbits can move only to certain other predetermined points, this being accomplished by the employment of an automatically operable circuit closer 53 which is connected in a plurality of circuits and serves to make and break each of them in its operation. The circuit closer 53 includes as many contacts 54 as there are rabbits. In the detail views of the device and in the diagrammatic views only four of such contacts 54 have been shown. The contacts 54 are carried by spring members 55 attached to and insulated from any suitable support 56. A member 57 is mounted for movement on a shaft 58, the said member 57 carries a contact plate 59 with which the contacts 54 are adapted to engage in the normal position of the said member 57. The member 57 is held in its normal position by the free end of an armature 59′ having limited movement in one direction on its pivot 60, which armature is attractable by the magnets of the electromagnetic device 61 upon the energization thereof. The armature 59′ is spring retractable. The member 57 is spring actuated, and it is movable to its normal position by the engagement therewith of a member 62 fast with the shaft 58, against the action of the spring 63 which actuates it. Upon the de-energization of the device 61 the armature 59′ drops and the free end thereof engages the hooked end of the member 57 to prevent the movement thereof until the device 61 is again energized, as will be understood.

As stated before it is also within the present invention to move all of the rabbits simultaneously after one of the rabbits has reached the goal as the winner, this being accomplished by the employment of a manually operable circuit breaker and switch 64 which is common to all of the circuits to be hereinafter described. The device 64 includes a flexible contact 65 in circuit with all of the electro-magnets 28 and a contact X. The said contact 65 is connected in series with a battery 66, as are contacts 67, which are of like number to the rabbits 15. The contacts 67 and X are in the nature of flexible members, which are engageable with a contact plate 68 forming a part of the device 64. The contact 65 and the plate 68 are carried by the shaft 58 hereinbefore mentioned. The contact 65 and the plate 68 are insulated from each other and from the shaft 58. The contacts 67 and X are carried by a supporting member 69 which is arranged adjacent the contact 65 and the plate 68 to coact therewith for purposes to appear.

Identical operating mechanisms are employed in connection with the driving mechanism for each rabbit, and for the sake of convenience and clearness, one of the said operating mechanisms will be described. A circuit closing device 70 is arranged in a casing 71 supported by the frame 12. The device 70 includes a ball 72, a ball holder 73, a member 74 having a ball receiving part or ring 75, a drop member 76, contact actuator 77, and contacts 78 and 79, the latter being adjustable relatively to the contact 78. The holder 73 is pivotally mounted as at 80, it is limited in its upward movement by the part 81 which is attached to the holder and which encounters the part 82 having the cushion 83. The holder 73 in its normal position engages a cushion 84 and a spring 85 facilitates the movement of the holder in tossing or propelling the ball 72. The drop member 76 is pivotally mounted as at 86, and it is arranged at the bottom of the ring 75 and extends partly within the same. The pivot for the member 76 is extended and has the contact actuator 77 attached thereto. One end of the actuator moves between stops 87, 87 and the opposite end thereof engages the contact 78. The actuator 77 is under the influence of a spring 88 whose normal tendency is to hold the actuator retracted in a normal position. The casing 71 embodies a transparent glass panel 89 through which the ball, its holder and the ring 75 are visible and this is very important for a reason to be explained. A manipulator 90 is arranged at a remote point from the holder 73 and correlated parts, in relation thereto for the operation of said correlated parts, the operation being effected by virtue of the intervention of the spring actuated lever 91, adjustable flexible member 92, bell-crank lever 93, flexible member 94, bell-crank lever 95, pivoted member 96, chain 97 and member 98 connected to the shaft which gives the ball holder its pivotal movement. The manipulator 90 consists of a lever 99 which is pivoted as at 100, and a knob 101 on the exposed end of the lever 99 which is practically encased. By striking the knob 101 a blow, the force of it will be transmitted to the various connected parts to the ball holder 73 causing the ball to take an arcuate course. With the proper skill the ball may be made to pass through the ring 75 with the result that the member 76 will drop and by virtue of the actuator 77 the contact 78 will be moved into engagement with the contact 79 closing the circuit 102 shown in Figure 12. The circuit 102 includes electro-magnet 28, circuit closer 47, contacts 78 and 79, contacts 65 and X of the device 64, and battery 66. It should now be manifest that, each time the ball 72 is propelled through the ring 75 the circuit 102 will be closed with the result that the electro-magnet 28 will be energized thus attracting the armature 26 thus bringing the wheel 25 into engagement with the wheel 24. Motion is transmitted to the chain 38 through the intervention of parts 33, 34, 35, 36 and 39 thus causing the particular rabbit to move a certain degree depending upon the speed with which the ball passes through the ring 75 and into contact with the drop member 76. With skill the ball may be propelled in a manner so that it will have the proper trajectory and it will pass through the ring 75 into the drop member 76 to move the latter comparatively slow with the result that the circuit 102 will remain closed for a comparatively longer period and as a consequence the rabbit will be made to travel a comparatively greater distance. The employment of the chain 97 and the pivoted member 96 prevents undue force from being imparted to the ball holder 73 and under such arrangement the parts will not be broken, or be deranged.

Figure 13:
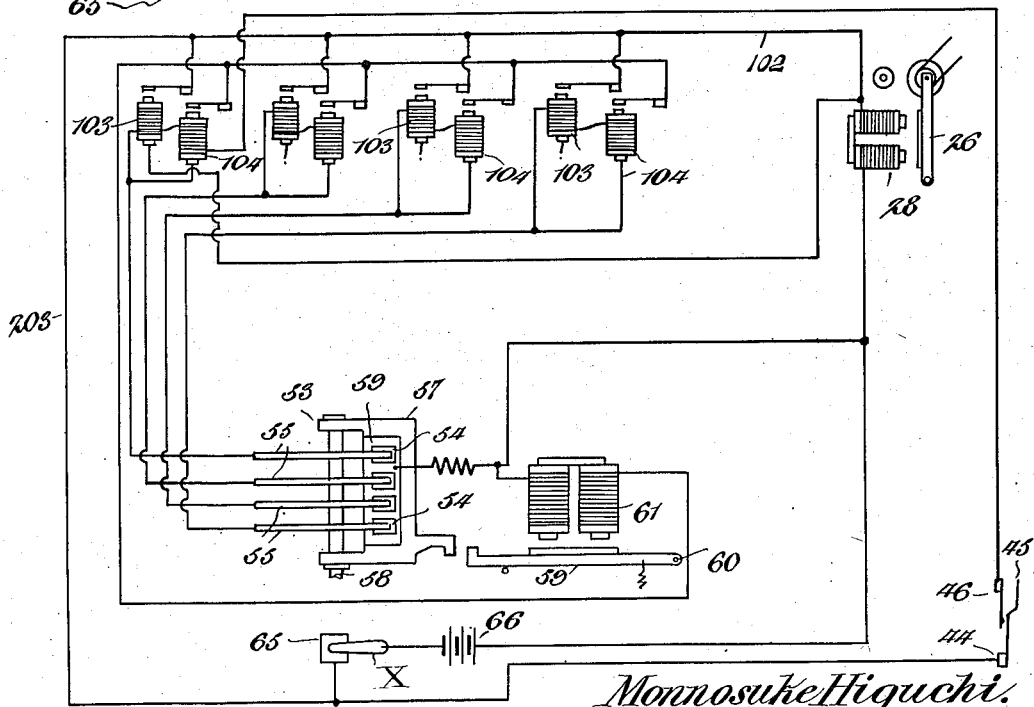

As the rabbits move up the hillside one of them will be the first to arrive at a point at which the wheels 17 and 18 of the carriage supporting the rabbit will encounter the circuit breaker 44 of the circuit 203—see Figures 13 and 16—to close said circuit, and the wheels 19 and 20 will encounter the circuit closer 47 and actuate the same to break circuit 102. The circuit 203 includes the electro-magnet 28; twelve sets of electro-magnet circuit breakers 103 and 104—all but one set of the circuit breakers 103 and 104 be respectively in other branch circuits—one set of circuit closers 103 and 104 being necessary to shunt the electrical energy; circuit closer 53; contacts 65 and X of the device 64; circuit breaker 44; and battery 66.

The actuation of the circuit breaker 44, as stated, closes the circuit 203 causing the energization of the magnets of the circuit breakers 103 and 104. The current passes through the contact 54, plate 59, through contacts 65 and X to energize the electro-magnet 28. The current then passes through circuit breaker 104 and the electro-magnetic device 61, which latter device operates to break all of the other branch circuits because the member 57 will be moved, with the result that the contact plate 59 will be moved out of engagement with all of the contacts 54. The current continues to energize the one particular electro-magnet 28 until the carriage wheel 18 passes the circuit breaker 44 just after the wheel 17 has encountered the circuit breaker 50 of 304. It will now be manifest that, the rabbit is moved by closing circuit 102 by using the manipulator 90 until the carriage wheels actuate the circuit breaker 44 when the circuit closer 53 automatically operates to render the other rabbits movable up to their respective circuit closers 47 where they remain until all of the rabbits are moved in unison in a manner to be explained.

Immediately after the circuit breaker 50 is encountered the wheels 17 and 18 of the carriage move its contact 51 against the contact 52 thus closing the circuit 304. The circuit 304 includes the circuit breaker 50, particular contacts 65' and X' of the device 64, a lamp 105, and battery 66. It will now be manifest that, the rabbit was moved automatically after the carriage wheels 17 and 18 actuated the circuit breaker 44 until the said wheels actuated the circuit breaker 50 for the illumination of the lamp 105. When wheels pass away from circuit breaker 44, the carriage will stop even if contacts 78 and 79 are closed by the manipulation of the manipulators because circuit closer 47 is still open. After the illumination of any lamp 105 by either rabbit carriage wheels and related parts, all of the rabbits are moved in unison to the starting point by the closing of a circuit 405.

The circuit 405 includes electro-magnet 28, circuit closer 41, contacts 67 and X and contact plate 68 of device 64, and battery 66.

The device 64 includes a casing 106 which has a fixed lug 107 thereabove. A pin 108 attached to the casing 106 has arranged thereon a tubular member 109 to one end of which there is attached a handle 110. A member 111 is attached to the member 109 and the same is guided for movement on an element 112 attached to the casing 106. A convolute spring 113 has one end thereof attached to the casing 106 and the other end thereof is attached to the member 111, and the said spring has a normal tendency to hold the member 111 into engagement with the lug 107 at either side thereof. The member 111 on one side holds the contact X into engagement with the contact 65, whereas when the member 111 is disposed in engagement with the lug 107 on the opposite side thereof the contacts 67 engage the contact plate 68. The handle when taken hold of affords a grip for effecting the movement of the member 111 to either side of the lug 107. When the contact plate 68 is brought into engagement with the contacts 67 the circuit 405 which is normally open will be closed with the result that all of the rabbits will be moved in unison to the place where the respective carriage wheels 19 and 20 actuate the respective circuit closers 41 thus automatically cutting off the current. The handle is then turned to the other side to energize contacts X and 65 (Fig. 13) so that the rabbits from the starting point must be moved by virtue of the manipulation of the manipulators 90.

In order that the driving mechanism which is rendered active by virtue of the energization of the electro-magnet 28 may be stopped when the said electro-magnet 28 is deenergized, pulley 25 is provided with a brake mechanism which includes a spring actuated pivotally mounted member 114 carrying a brake shoe 115 which engages the wheel 25. Adjusting means 116 is employed to compensate the wear of the brake shoe 115 and for the obtainment of the proper braking action as will be understood.

When the member 111 is moved to a position in which the contact plate 68 and the contacts 67 are in engagement, the shaft 58 by reason of its connection to the casing 106, will be turned thus bringing screws or the like 117 carried by the shaft 58 into engagement respectively with lugs 118 of the bell-crank levers 95 which are loosely mounted on the shaft 58. With the screws 117 in engagement with the lugs 118 it is impossible to actuate the ball holders 73 until the member 111 is moved to the opposite side of the fixed lug 107.

From the foregoing it will be manifest that, the rabbits may be moved singly through the manipulation of the manipulators 90; the rabbit reaching its circuit breaker 44 first automatically prevents the other rabbits from moving past their respective circuit closers 47 although the first rabbit to reach its circuit breaker 44 is moved automatically until the lamp 105 is illuminated; the rabbits are movable in unison after the lamp 105 has been illuminated by the first rabbit to reach the goal; the ball holders 73 cannot be operated when the rabbits are being moved in unison; the movement of the rabbits singly is accomplished in a novel manner because of the visible circuit actuating parts which are operatively connected to the manipulators 90 which are arranged at remote points relatively speaking; and the apparatus is one the use of which requires skill more than anything else; the surface over which the rabbits move may simulate a mountain-side or hillside, or it may be in simulation of anything else as an obvious expedient; and the circuit closing devices 70 may be actuated in any other manner than by throwing balls.

When the wheels encounter circuit breaker 44, circuit 203 will close through contact 53, 103 and 104 which belong to the first carriage. The magnet contact breakers 103, 104, will energize to attract its armature and make two different circuits: —1,— through magnet 61 which breaks the contact 53 so current cannot pass 53. But for only the first carriage, the current will pass through contact 104 and its armature, so that magnet contacts 103, 104, will not lose their power, and contact 103 will also still be closed: —2,— through contact 103 and its armature, magnet 28 so that while contact 103 is closing, magnet 28 is being engaged, that is, the carriage runs automatically. But shortly after the carriage will break the contact 47 (this current will pass 102 of Fig. 12). The contact 78, 79 is now in the broken circuit 102. The manipulator 90 cannot make the circuit 102 close, for, as explained, the current passes through magnet contact 103 and magnet automatically energizes although main circuit 102 of magnet is broken.

In this way the carriage will encounter contact 50, close the circuit 304 and put light 105 on. Immediately after light is on, wheels will pass contact 44 and magnet contacts 103, 104 lose their power and break contact with their armatures, the circuit through contact 103 to magnet 28 will break and of course, the carriage will stop and because circuit 102 has not yet closed the carriage cannot move.

Other carriages may reach their contact 44 but contact 53 is already broken by the first carriage so that circuit 203 cannot close. When carriages encounter contact 47, their respective circuits are broken and the carriages cannot move further.

Figure 15:
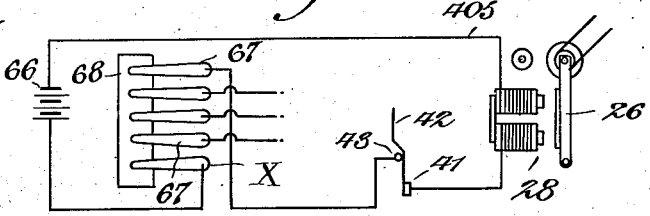

After race is finished, or after the first carriage reaches the goal and winner's light is on, the switch 64 must be changed by handle 110 and circuit will change, as in Fig. 15. All magnets 28 will energize and the carriages will move under mountains and come up to starting point. The carriages encounter contacts 41 and break circuit 405, then the carriages stop.

When the handle 110 is turned back by hand, circuit will change as at first and in position to play again.

What is claimed is:

1. In an amusement apparatus as characterized, inanimate life-like objects, driven mechanisms for moving said objects, driving mechanism for operating said driven mechanisms, electro-magnetic controlling mechanism for controlling the operation of the driven mechanisms by the driving mechanism, and operating mechanisms for operating the controlling mechanism.

2. In an amusement apparatus as characterized, inanimate life-like objects, driven mechanisms for moving said objects, driving mechanism for operating said driven mechanisms, electro-magnetic controlling mechanism including circuit closers for controlling the operation of the driven mechanisms by the driving mechanism, and operating mechanisms for operating the controlling mechanism, each of said operating mechanisms including a manipulator, a ball, a ball holder operatively connected to said manipulator and capable of propelling said ball when operated, and a device operable by said ball which actuates one of said circuit closers.

3. In an amusement apparatus as characterized, inanimate life-like objects, driving means for effecting the movement of the objects singly or in unison, and means for rendering the driving means active including electric circuits each including a circuit closer, a manipulator, a ball, a ball holder operatively connected to said manipulator and capable of propelling said ball when operated, and a device operable by said ball which actuates said circuit closer.

4. In an amusement apparatus as characterized, inanimate life-like objects, driving means for effecting the movement of the objects singly or in unison, and means for rendering the driving means active including electric circuits each including a circuit closer, a pivotally mounted manipulator, a freely movable ball, a pivotally mounted ball holder and actuator arranged remotely from the manipulator and operatively connected thereto and capable of return movement to a normal position, and a device operable by virtue of said ball which device actuates said circuit closer.

5. In an amusement apparatus as characterized, inanimate objects, driving means for effecting the movement of the objects singly or in unison, and mechanism for rendering the driving means active including electric circuits each including a circuit closer, a pivotally mounted spring actuated maniplator, a pivotally mounted spring actuated ball actuator, a freely movable ball confined for movement within certain limits, and a device operable by virtue of said ball for actuating said circuit closer, the said ball actuator being operatively connected to said manipulator.

6. In an amusement apparatus as characterized, inanimate objects, driving means for effecting the movement of the objects singly or in unison; and mechanism for rendering the driving means active including electric circuits each including a circuit closer, a pivotally mounted spring actuated manipulator, a freely movable ball confined for movement within certain limits, a pivotally mounted spring actuated ball actuator operatively connected to said manipulator, a device operable by virtue of said ball for actuating said circuit closer, and cushioning means for said ball actuator.

7. In an amusement apparatus as characterized, inanimate objects, driving means for effecting the movement of the objects singly or in unison; and mechanism for rendering the driving means active including electric circuits each including a circuit closer, a pivotally mounted spring actuated manipulator, a freely movable ball confined for movement within certain limits, a pivotally mounted spring actuated ball actuator freely movable, a connection between the manipulator and said actuator for effecting the movement thereof, means allowing the independent movement of the actuator subsequent to its movement with the said connection, and a device operable by virtue of said ball for actuating said circuit closer.

8. In an amusement apparatus as characterized, inanimate rabbits on carriages having traction wheels, driven mechanisms for moving said carriages, driving mechanism for driving said driven mechanisms, electro-magnetic controlling mechanism for controlling the operation of the driving mechanism; the said controlling mechanism including a set of branch circuits and a master circuit; each of the branch circuits when rendered active rendering the driving mechanism operative to move one of said carriages; the master circuit when rendered active rendering all but one of the branch circuits inactive to prevent the movement of all but one of said carriages beyond a predetermined point.

9. In an amusement apparatus as characterized, inanimate rabbits on carriages having traction wheels, driven mechanisms for moving the carriages, driving mechanism for driving said driven mechanisms, electro-magnetic controlling mechanism for controlling the operation of the driving mechanism, the said controlling mechanism including a set of branch circuits and a master circuit, each of the branch circuits when rendered active rendering the driving mechanism operative to move one of said carriages, the master circuit when rendered active rendering all but one of the branch circuits inactive to prevent the movement of all but one of said carriages beyond a predetermined point; and in combination, a set of circuits each including a lamp, a source of electrical energy, a circuit breaker in the path of movement of certain wheels of one of said rabbit-carriages to be actuated thereby to close its respective circuit.

10. In an amusement apparatus as characterized, inanimate rabbits on carriages having traction wheels, driving means for moving the carriages singly or in unison, electro-magnetic controlling mechanism for controlling the operation of the driving means, the said controlling mechanism including a set of branch circuits and a master circuit, each of the branch circuits when rendered active causing the operation of the driving means to move one of said carriages, the master circuit when rendered active causing all but one of the branch circuits to become inactive to prevent the movement of all but one of said carriages beyond a predetermined point; and in combination, operating mechanism for effecting the operation of the said controlling mechanism.

11. In an amusement apparatus as characterized, inanimate rabbits on carriages having wheels, driving means for moving the carriages singly or in unison, electro-magnetic controlling mechanism for controlling the operation of the driving means, and including sets of branch circuits and a master circuit, the activity of each of one set of said branch circuits rendering said controlling mechanism active, each of said last mentioned circuits including a circuit closer in the path of movement of certain wheels of one of said carriages to be actuated thereby, and a plurality of circuit breakers in said master circuit, the wheels of either carriage actuating one of the circuit breakers of the master circuit and one of the branch circuit closers allowing the movement of one of the said carriages to a predetermined point and preventing the movement of all of the other carriages beyond a predetermined point.

12. In an amusement apparatus as characterized, inanimate rabbits on carriages having wheels, driving means for moving the carriages singly or in unison, electro-magnetic controlling mechanism for controlling the operation of the driving means and including a plurality of circuits, one of said circuits being normally open, a ball actuated device for closing said normally open circuit, a circuit closer in the normally open circuit including a contact in the path of movement of certain wheels of one of said carriages to be actuated thereby to prevent the closing of said normally open circuit by the operation of said ball actuated device.

13. An amusement apparatus as characterized having in combination, a plurality of movable inanimate objects, an electric circuit including a source of energy, an electro-magnetic device and a circuit closer; a ball, a ball actuated device operable by virtue of the ball being propelled through a part thereof, means for propelling said ball, and means for effecting the movement of said objects singly or in unison, the said last mentioned means being operable upon the energization of the said electro-magnetic device in closing said circuit by the actuation of said ball actuated device.

14. An amusement apparatus as characterized having in combination, a plurality of movable inanimate objects, normally open electric circuits each including a circuit closer and an electro-magnetic device; balls, ball actuators, means for effecting the actuation of said circuit closers, said means including ball actuated devices; the balls, ball actuators and ball actuated devices being encased by casings each having a transparent panel to make the encased parts visible, manipulating means connected to each of said ball actuators.

15. An amusement apparatus as characterized having in combination, a plurality of inanimate objects which are movable singly or in unison, normally open electric circuits each including a circuit closer operable in effecting the movement of one of said objects; balls, ball actuators, means for effecting the actuation of said circuit closers, said means including ball actuated devices; the balls, ball actuators and ball actuated devices being encased by casings each having a transparent panel to make the encased parts visible, and manipulating means connected to each of said ball actuators, said manipulating means including a manipulator arranged at a point remote from its ball actuator.

16. An amusement apparatus as characterized having in combination, a plurality of movable inanimate objects, normally open electric circuits each including a circuit closer; balls freely movable, ball actuators, means for effecting the actuation of the circuit closers including ball actuated devices; the balls, ball actuators and ball actuated devices being encased by casings each having a transparent panel to make the encased parts visible, manipulating means connected to each of said ball actuators, and means for preventing the movement of all but one of the said objects beyond a predetermined point during the movement of the one object to a predetermined point.

17. An amusement apparatus as characterized having in combination, a plurality of movable inanimate objects, means for effecting the movement of the objects singly including normally open electric circuits each including a circuit closer, freely movable balls, ball actuators, operating devices including ball actuated elements; the balls, ball actuators and ball actuated elements being encased by casings each having a transparent panel to make the encased parts visible, manipulating means connected to each of the ball actuators, means for preventing all but one of said objects beyond a predetermined point during the movement of the one object to a predetermined point, and means electrically connected in each of said circuits by virtue of which the said objects may be moved in unison.

18. In an amusement apparatus, objects, a simulatory surface over which the objects move, movable wheeled carriages each of which supports one of said objects, driving means for effecting the movement of the carriages singly or in unison, and means for rendering the driving means active and inactive including electric circuits each including a circuit closer, and a device operable by a ball to actuate said circuit closer.

19. In an amusement apparatus provided with objects to move along paths of travel, driving mechanism for moving said objects, a pocket and playing ball in said apparatus, and a knob actuated member for throwing said ball into said pocket for placing said driving mechanism in operation.

20. In an amusement apparatus provided with objects to move along paths of travel, driving mechanism for moving said objects, a visible pocket and ball operating mechanism in said apparatus, and a manually manipulated member for throwing the ball into said pocket.

21. A game apparatus which comprises a missile, a casing within which said missile is disposed, means within the casing for throwing the missile and circuit-operating means actuated by the missile when the missile is thrown by the skill of the operator in a predetermined manner.

In testimony whereof I have affixed my signature.

MONNOSUKE HIGUCHI.